United States Patent [19]
Oishi et al.

[11] Patent Number: 5,757,363
[45] Date of Patent: May 26, 1998

[54] COMPUTER INPUT DEVICE AND KEYBOARD

[75] Inventors: Yuji Oishi, Shizuoka-ken; Hideki Matsuda, Kasugai; Yoshiaki Hayakawa, Handa; Kimitoshi Nakamura, Hamamatsu, all of Japan

[73] Assignee: Hagiwara Sys-Com Co., Ltd., Aichi-ken, Japan

[21] Appl. No.: 682,899

[22] Filed: Jun. 28, 1996

[51] Int. Cl.$^6$ ............................................. G08C 21/00
[52] U.S. Cl. ........................... 345/173; 345/145; 345/157; 345/174
[58] Field of Search ........................... 345/145, 156, 345/157, 163, 168, 173, 174, 179; 128/18

[56] References Cited

U.S. PATENT DOCUMENTS

| | | | |
|---|---|---|---|
| 4,636,582 | 1/1987 | Moriwaki et al. | 178/18 |
| 4,983,787 | 1/1991 | Kunikane | 178/18 |
| 5,010,213 | 4/1991 | Moriwaki et al. | 178/18 |
| 5,369,228 | 11/1994 | Faust | 178/18 |
| 5,518,078 | 5/1996 | Tsujioka et al. | 178/18 |
| 5,541,370 | 7/1996 | Matsuda et al. | 178/18 |
| 5,583,539 | 12/1996 | Hiketa et al. | 345/146 |
| 5,617,117 | 4/1997 | Kataoka et al. | 345/157 |
| 5,673,066 | 9/1997 | Toda et al. | 345/157 |

FOREIGN PATENT DOCUMENTS

| | | |
|---|---|---|
| 62-128319 | 6/1987 | Japan. |
| 425925 | 1/1992 | Japan. |

Primary Examiner—Steven J. Saras
Assistant Examiner—Vincent E. Kovalick
Attorney, Agent, or Firm—Davis and Bujold

[57] ABSTRACT

A proposed computer input device for transmitting the displacement data representing the quantity and direction of the movement of a cursor to a computer is operable in a narrow space and easily portable. The input device is provided with a pressure sensitive pad composed of a conductive layer formed on the underside of a flexible sheet and a resistor layer formed on the upper face of a substrate at a predetermined interval from the conductive layer. When the flexible sheet is depressed, the conductive layer contacts the resistor layer at the depressed position. In a control circuit connected to the conductive layer and the resistor layer, when the contact of the conductive layer with the resistor layer is detected, a voltage of 5V is applied alternately in a horizontal direction and a vertical direction on the surface of the resistor layer. The depressed position on the pressure sensitive pad is sequentially computed from the voltage value produced on the conductive layer when the voltage is applied. Based on the computation result, the movement count number is calculated and transmitted to the computer.

8 Claims, 11 Drawing Sheets

COMPUTER INPUT DEVICE AND KEYBOARD

FIELD OF THE INVENTION

This invention relates to an input device for entering the displacement data representing the quantity and direction of the movement of a cursor displayed on a display terminal provided in a computer, and a keyboard provided with the input device.

BACKGROUND OF THE INVENTION

Conventionally, as disclosed in Japanese laid-open Patent Application Nos. 62-128319 and 4-25925, a so-called mouse is known. The mouse is provided with a ball built in a hand-held case for rotatably contacting a surface, and by detecting the quantity and direction of the rotation of the ball, the displacement data for moving the cursor is transmitted from the mouse to the computer.

In operation, the mouse is moved on the surface of a table or the like, thereby rotating the ball and transmitting the displacement data of the cursor to the computer. Therefore, the mouse is difficult to use on a narrow space. Furthermore, the mouse requires a rotary mechanism for rotatably supporting the ball in contact with the surface of the table or the like, which forms most part of the weight of the mouse. Since the mouse is weak against any shock, it is inconvenient for transportation.

Also, a sheet input device is proposed. When characters or other data are entered on a sheet surface using a pen, the pen distorts or depresses the sheet surface, thereby detecting coordinates on the sheet surface. According to the movement of the pen on the sheet surface, the coordinates are sequentially detected and are transmitted as the hand written information to the computer. When the cursor is moved using the sheet input device, no rotary mechanism is required, different from the mouse. However, the sheet surface requires an area corresponding to the area of the movement of the cursor on the display terminal, thereby enlarging the entire size of the sheet input device.

Usually, in addition to such input device for moving the cursor, a keyboard is connected to the computer for the input of alphabet, numbers or other data. Therefore, the effective space for the aforementioned input device is limited by the occupation of the keyboard. It is difficult to move the cursor in a desired direction and by a desired distance and input the information using the keyboard, in a limited space.

SUMMARY OF THE INVENTION

Wherefore, an object of the present invention is to provide an easily portable, compact input device of the computer, which can be operated in a narrow space.

Another object of the present invention is to provide a keyboard appropriate for entering the displacement data representing the movement of a cursor in a desired direction and by a desired distance, and characters, numbers and other data in a limited space.

To attain this or other object, the present invention provides an input device for inputting the displacement data representing the quantity and direction of the movement of a cursor to a computer. The input device is provided with a pressure sensitive pad in which a planar conductive layer and a planar resistor layer are disposed at a predetermined interval from each other, at least an upper one of the conductive layer and the resistor layer is formed on the underside of a flexible sheet, such that when the top face of the flexible sheet is depressed, the conductive layer and the resistor layer contact each other at the corresponding depressed position. The input device is also provided with a contact detection means for detecting whether or not the conductive layer and the resistor layer contact each other, and a voltage application means for applying a voltage alternately in a horizontal direction and a vertical direction of the surface of the resistor layer when it is detected by the contact detection means that the conductive layer and the resistor layer are in contact with each other. The input device is further provided with a position computation means for detecting the voltage of the conductive layer at the same time when the voltage is applied by the voltage application means and for sequentially computing the depressed position on the flexible sheet based on the value of the voltage detected when the voltage is applied in the horizontal direction and the value of the voltage detected when the voltage is applied in the vertical direction. The input device is also provided with a memory means for storing the computation results of the position computation means, a data preparation means for preparing the displacement data representing the quantity and direction of the movement of the depressed position in a predetermined time unit based on a plurality of computation results stored in the memory means, and an output means for outputting the displacement data prepared by the data preparation means to the computer. The input device is also provided with an initialization means for stopping the operation of the voltage application means and canceling the content stored in the memory means.

The input device is characterized by the provision of a contact time measurement means for measuring the time the conductive layer and the resistor layer are in contact with each other based on the detection result of the contact detection means, and a definition signal output means for determining whether or not the time measured by the contact time measurement means is within a predetermined time and for outputting the definition signal for indicating the definition of the position of the cursor to the computer when the time is within the predetermined time.

In the input device, the contact between the conductive layer and the resistor layer is again detected by the contact detection means before the definition signal output means completes the output of the definition signal. When the time measured by the contact time measurement means exceeds the predetermined time, the definition signal output means continues the output of the definition signal, until no contact between the conductive layer and the resistor layer is detected by the contact detection means.

In the input device, the contact between the conductive layer and the resistor layer is again detected by the contact detection means before the definition signal output means completes the output of the definition signal. When the time measured by the contact time measurement means is within the predetermined time, the definition signal output means once stops the output of the definition signal at the same time when no contact between the conductive layer and the resistor layer is detected any more by the contact detection means. After a predetermined period of time elapses, the definition signal output means again transmits the definition signal.

The present invention also provides a keyboard for the input of the information corresponding the depression of keys to the computer. The keyboard is provided with the aforementioned input device, and the pressure sensitive pad is disposed on a predetermined position of a surface of the keyboard.

The keyboard is provided with keys having switchable functions of moving the cursor and of entering the predetermined data other than cursor movement data, responsive to the operation of a predetermined changeover key. The keyboard is also provided with the aforementioned pressure sensitive pad replacing cursor keys exclusively for moving the cursor and disposed on the position in which the cursor keys were disposed.

In the computer input device the planar conductive layer vertical interval. At least the upper one of the conductive layer and the resistor layer is formed on the underside of the flexible sheet, thereby forming the pressure sensitive pad. When the upper face of the flexible sheet is depressed, the conductive layer and the resistor layer are brought in contact with each other at the depressed position.

When the contact detection means detects the contact between the conductive layer and the resistor layer or the depression of the flexible sheet, the voltage application means alternately applies a voltage horizontally and vertically to the surface of the resistor layer.

When a voltage is applied horizontally to the surface of the resistor layer, the voltage corresponding to the depressed position in the horizontal direction of the flexible sheet is generated on the conductive layer. When a voltage is applied vertically to the surface of the resistor layer, the voltage corresponding to the depressed position in the vertical direction of the flexible sheet is generated on the conductive layer. The position computation means detects the voltage of the resistor layer synchronously when the voltage application means applies the voltage, and sequentially the depressed position on the flexible sheet based on the voltage value detected when the voltage is applied horizontally and the voltage value detected when the voltage is applied vertically.

The computation results of the position computation means are stored in the memory means. The data preparation means prepares the displacement data representing the quantity and direction of the movement of the depressed position on the flexible sheet for a predetermined unit time, based on a plurality of computation results stored in the storage means. The output means transmits the displacement data prepared by the data preparation means to the computer.

When the contact detection means detects that there is no more contact between the conductive layer and the resistor layer, the initialization means stops the operation of the voltage application means and cancels the content stored in the memory means.

In the computer input device, when the operator moves the pen, the finger tip or other member being in contact with the upper face of the flexible sheet, the depressed position is sequentially computed by the position computation means and stored in the memory means. The displacement data representing the quantity and direction of the movement of the depressed position for the predetermined unit time is prepared by the data preparation means and transmitted to the computer.

Subsequently, in the computer, the cursor displayed on the display is moved corresponding to the quantity and direction of the movement represented by the displacement data. Therefore, the operator of the input device can move the cursor in a desired direction and by a desired distance on the display by moving the pen, the finger tip or the member on the flexible sheet of the pressure sensitive pad.

When the operator releases the pen, the finger tip or other member from the flexible sheet, the contact detection means detects that there is no contact between the conductive layer and the resistor layer, and the initialization means stops the operation of the voltage application means and cancels the content stored in the memory means. Thereafter, when the operator again moves the pen, the finger tip or other member in contact with the upper face of the flexible sheet, this time depressed position is set as a new origin, and the displacement data representing the displacement from the new origin is prepared and transmitted to the computer.

Therefore, when the operator of the input device moves the pen, the finger tip or other member towards the corner of the flexible sheet, releases the member from the corner of the flexible sheet, again touches a different position on the flexible sheet with the member and again moves the member from the position toward the same corner, then the cursor can be moved in the same direction. Even when the area of the pressure sensitive pad or the flexible sheet is smaller than the movement area of the cursor on the display, by intermittently and repeatedly moving the member on the flexible sheet, the cursor can be continuously moved in a desired direction.

In the present invention, the entire size of the computer input device can be reduced and the computer input device can be operated in a small space on the table or other. Different from the mouse, the computer input device requires no rotary mechanism for rotating supporting the ball, is light-weight, can bear any shock and is easy for transportation.

In the computer input device, the contact time measurement means measures the time during which the conductive layer and the resistor layer are in contact, based on the detection result of the contact detection means. The definition signal output means determines whether or not the time measured by the contact time measurement means is within a predetermined time. When the time is within the predetermined time, the definition signal is transmitted to the computer, indicating that the cursor position is defined or settled.

The conventional input device or the mouse is usually provided with the definition key or click key for indicating the definition of the cursor position to the computer. By moving the cursor to the desired position and depressing the definition key, the cursor position is defined. However, in the computer input device of the present invention, just by depressing the flexible sheet of the pressure sensitive pad for the predetermined time or shorter, the cursor position can be defined or clicked.

In the computer input device, the contact detection means again detects the contact between the conductive layer and the resistor layer by the time the definition signal output means completes the output of the definition signal. When the time measured by the contact time measurement means exceeds the predetermined time, the definition signal continues to be transmitted, until the contact detection means detects no contact between the conductive layer and the resistor layer.

Immediately after the flexible sheet of the pressure sensitive pad is depressed for the predetermined time or shorter and released, the flexible sheet is again depressed, then the definition signal is continuously transmitted to the computer. The depressed position of the flexible sheet is further moved in a desired direction, while the displacement data representing the quantity and direction of the movement of the depressed position for a predetermined unit time is transmitted to the computer as aforementioned. The same operation as the dragging or moving of the mouse with the definition key depressed can thus be easily conducted.

When the contact detection means again detects the contact between the conductive layer and the resistor layer by the time the definition signal output means completes the output of the definition signal. When the time measured by the contact time measurement means is within the predetermined time, the contact detection means detects no contact between the conductive layer and the resistor layer. At the same time, the output of the definition signal is once stopped. After a predetermined time elapses, the definition signal is again transmitted.

Immediately after the flexible sheet of the pressure sensitive pad is depressed for the predetermined time or shorter and released, the flexible sheet is depressed for the predetermined time or shorter, then the definition signal is intermittently transmitted to the computer twice. This operation similar to the double-clicking of the mouse can thus be easily conducted.

The present invention also provides a keyboard provided with the aforementioned input device. The pressure sensitive pad of the input device is disposed at the predetermined position on the surface of the keyboard.

By moving the pen, the finger tip or other member in contact with the upper face of the flexible sheet of the pressure sensitive pad disposed on the surface of the keyboard, the cursor can be moved in the desired direction and by the desired distance. When any key provided on the surface of the keyboard is depressed, the alphabetical, numerical or other data can be transmitted to the computer, corresponding to the depressed key.

Therefore, only in the space where the keyboard is situated, the cursor can be moved in the desired position and at the same time alphabetical, numerical and other data can be entered. The computer input system can be built in such narrow space. Since no separate input device for moving the cursor is required, the space on the table or other can be used effectively.

In the keyboard with the aforementioned provided therein, just by depressing the flexible sheet of the pressure sensitive pad for the predetermined time or shorter, the so-called clicking can be done. Immediately after the flexible sheet of the pressure sensitive pad is depressed for the predetermined time or shorter, the flexible sheet is again continued to be depressed, then the so-called dragging can be done. Immediately after the flexible sheet of the pressure sensitive pad is depressed for the predetermined time or shorter, the flexible sheet is again depressed for the predetermined time or shorter, the so-called double-clicking can be done.

The pressure sensitive pad can be disposed to any position on the surface of the keyboard. However, especially when the pressure sensitive pad is disposed in the position the cursor keys were disposed, the aforementioned advantages can be obtained, without enlarging the entire area of the keyboard.

In the keyboard, the predetermined keys have switchable functions of moving the cursor and of entering the predetermined data other than the cursor moving data, responsive to the operation of a changeover key. The cursor keys exclusive for moving the cursor is replaced with the pressure sensitive pad of the input device.

Therefore, without enlarging the entire area of the keyboard, the pressure sensitive pad can be provided on the keyboard. Additionally, as required for the application program or other program executed in the computer, by depressing the changeover key, the predetermined keys can be used as the cursor keys.

In the keyboard of the present invention, the cursor can be moved in the desired direction with the pressure sensitive pad and the cursor can be moved vertically and horizontally with the predetermined keys. Therefore, the application programs, in which the cursor needs to be moved with the cursor key, not with the mouse or the pressure sensitive pad, can be dealt with.

BRIEF DESCRIPTION OF THE DRAWINGS

The invention will now be described, by way of example, with reference to the drawings, in which.

DETAILED DESCRIPTION OF THE PREFERRED EMBODIMENTS

Figure 1:
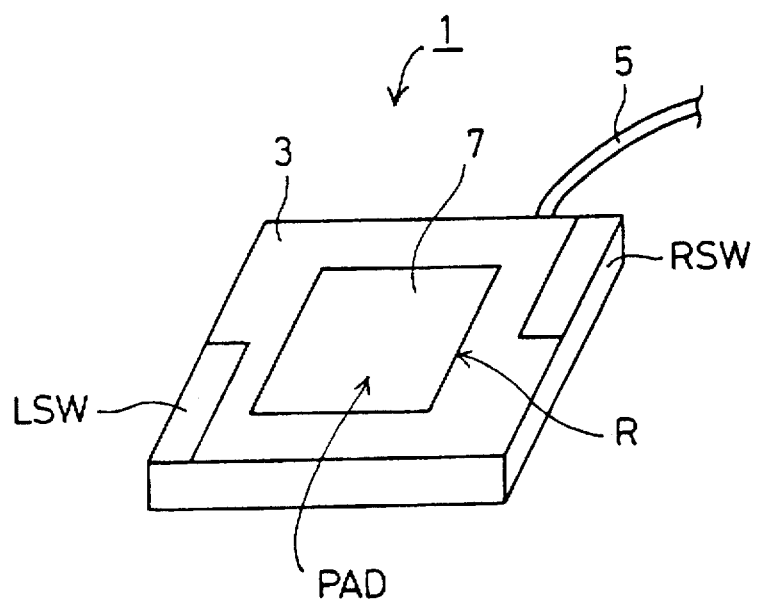
FIG. 1 is a diagrammatic representation showing an input device embodying the invention.

As shown in FIG. 1, an input device 1 of a first embodiment, for transmitting the displacement data of the quantity and direction of the movement of a cursor displayed on a CRT or a liquid crystal display provided in a not-shown computer, is about 80 mm(31.5 inches) wide, about 140 mm(55.1 inches) long and 20 mm(7.9 inches) thick.

Also as shown in FIG. 1, a pressure sensitive PAD detailed later is provided in a square region R having 60 mm(23.6 inches) sides on the middle of a body 3. A definition key LSW for indicating the definition of a cursor position to the computer and a cancellation key RSW for indicating the cancellation of the input are provided on the respective sides of the pressure sensitive PAD of the body 3. A cable 5 is extended from a side face of the body 3 for connecting the input device 1 to the computer.

Figure 2A:
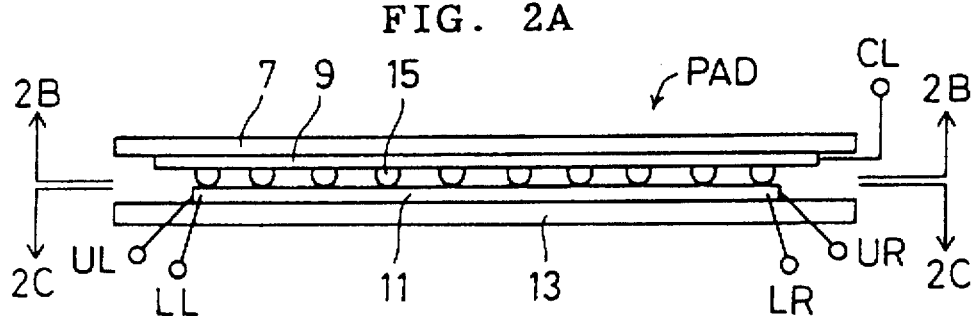
FIGS. 2A, 2B and 2C are explanatory views showing the structure of a pressure sensitive pad for use in the input device.
Figure 2B:
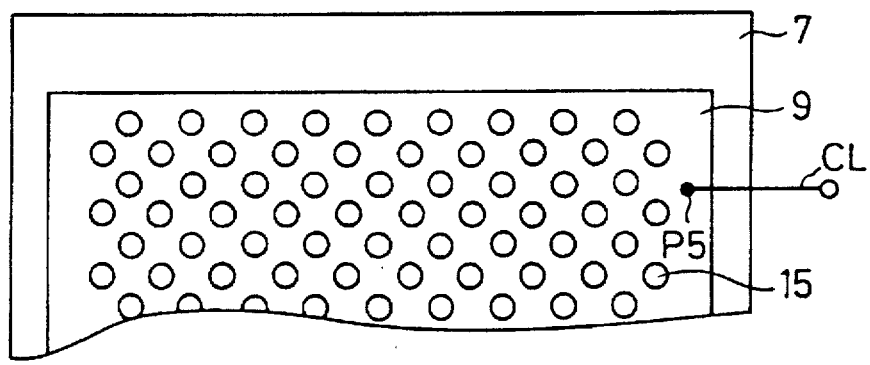

As shown in FIG. 2A, the pressure sensitive PAD is composed of a flexible sheet 7 formed of a 0.55 mm(0.216 inch) thick insulating polyurethane film, a 0.01 mm(0.0039 inch) thick conductive layer 9 formed by uniformly applying conductive ink on the underside of the flexible sheet 7, and a substrate 13 having a resistor layer 11, mainly composed of carbon, formed opposite to the underside of conductive layer 9 at an interval. As shown in FIGS. 2A and 2B, multiple insulating dots 15 are printed on the surface of the conductive layer 9 opposite to the resistor layer 11 using insulating ink mainly composed of titanium oxide and polyurethane resin. In the embodiment, the insulating dots 15 have a diameter of 0.1 mm(0.039 inch) and a thickness of 0.06 mm(0.024 inch), and are disposed opposite to one another at an interval of 0.1 mm(0.039 inch).

Both the flexible sheet 7 and the substrate 13 are rectangular and larger than the square region R of the body 3. The resistor layer 11 formed on the substrate 13 is square having the same size as that of the square region R. The conductive layer 9 formed under the flexible sheet 7 is of the same size as or larger than the resistor layer 11. As shown in FIG. 1, the pressure sensitive PAD is disposed such that the surface of flexible sheet 7 is exposed and the square region R of body 3 coincides with the region of resistor layer 11.

Figure 2C:
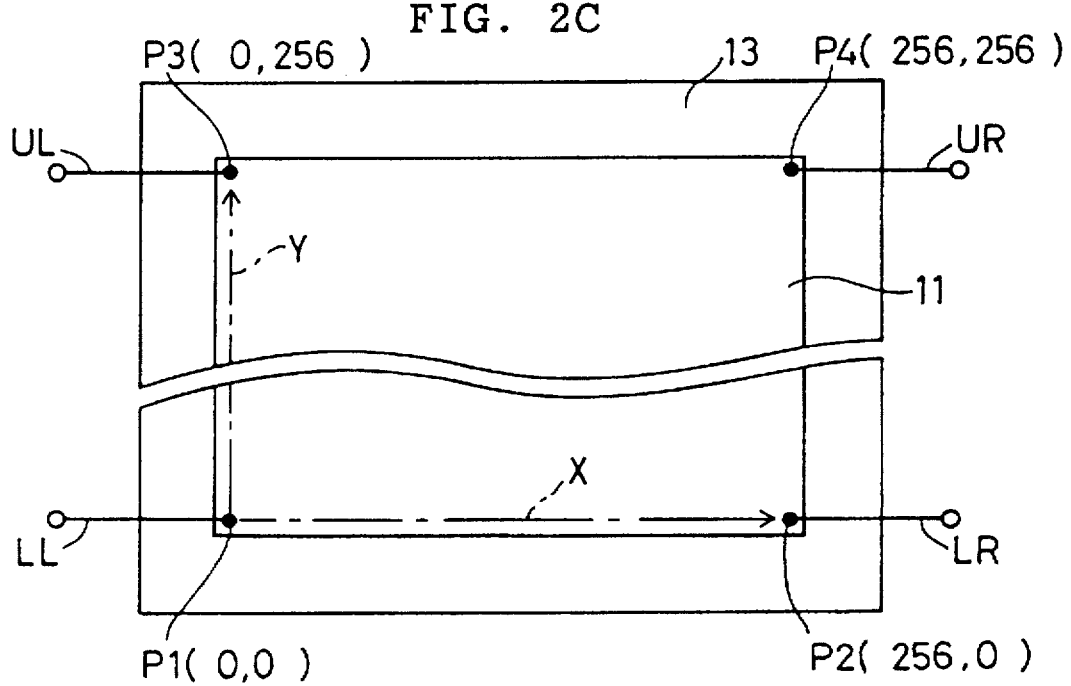
Figure 3:
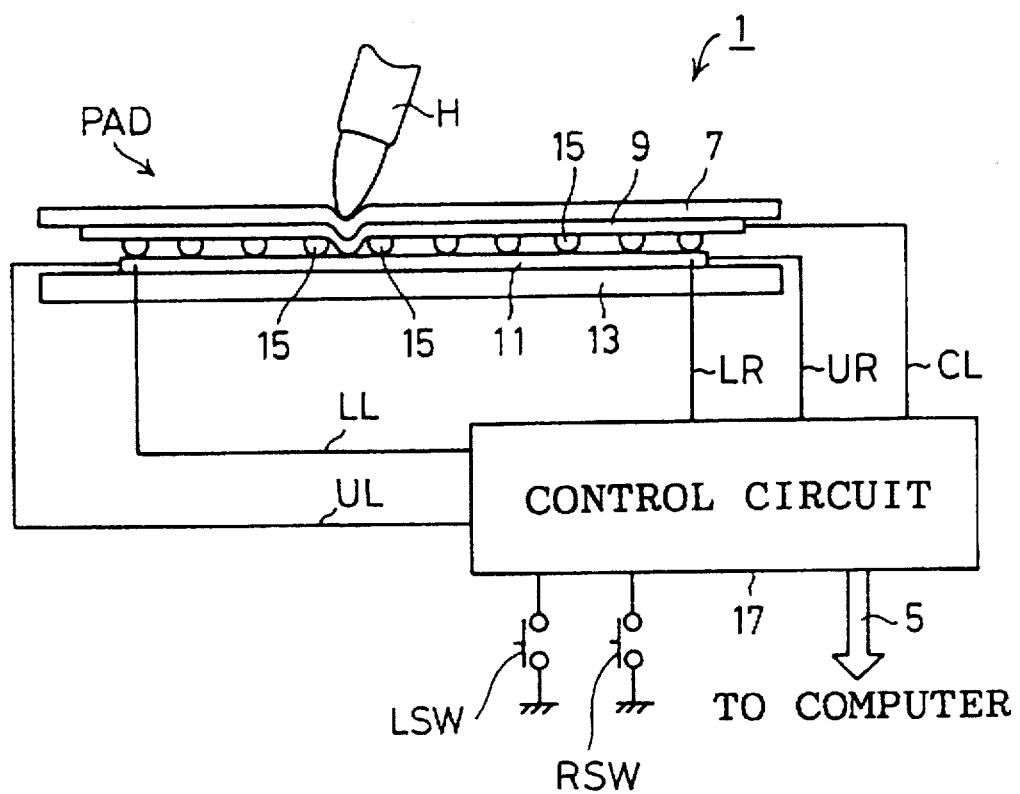
FIG. 3 is an explanatory view showing the connection between the pressure sensitive pad and a control circuit.

As shown in FIG. 2C, lines LL, LR, UL and UR are extended from four corners P1, P2, P3 and P4 of resistor layer 11, respectively, and are, as shown in FIG. 3, connected to a control circuit 17. Additionally, as shown in FIG. 2B, a line CL is extended from a predetermined position P5 of conductive layer 9 and is, as shown in FIG. 3, connected to the control circuit 17.

Figure 4:
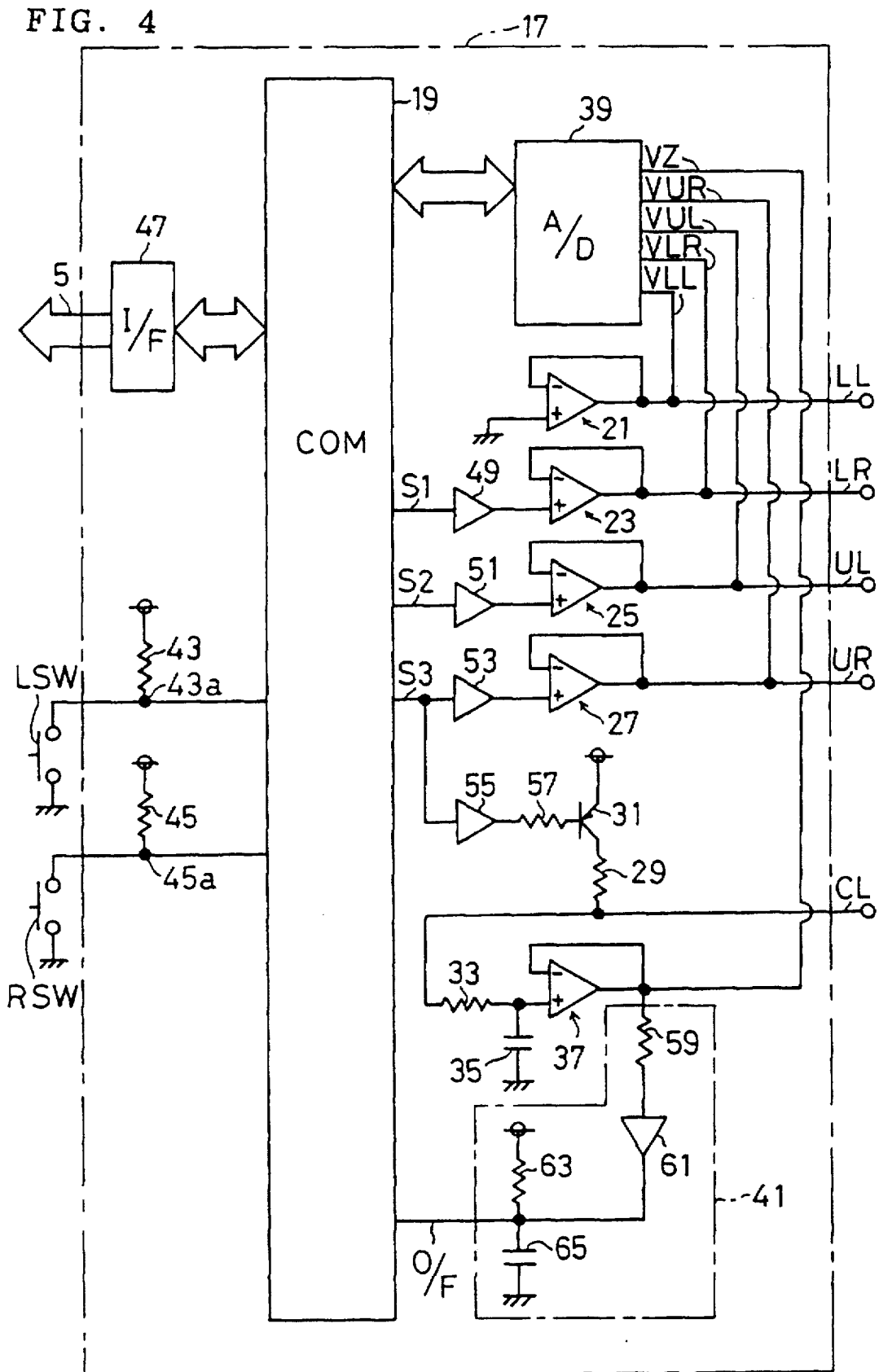
FIG. 4 is a block diagram showing the structure of the control circuit.

The control circuit 17 is now explained, referring to FIG. 4. The control circuit 17 is provided with a microcomputer 19 composed of a single chip having CPU, ROM and RAM, output buffer circuits 21, 23, 25 and 27 each composed of an operative amplifier, a PNP transistor 31, an input buffer circuit 37 composed of an operative amplifier, an A/D converter 39, a waveform shaping circuit 41, pull-up resistors 43, 45 and an interface circuit 47. The output buffer circuit 21 applies a low level voltage, of 0V in the embodiment, to the line LL of resistor layer 11, while the output buffer circuits 23, 25 and 27 applies a low level voltage or a high level voltage, of 5V in the embodiment, to the lines LR, UL and UR of resistor layer 11 corresponding to the output signals S1, S2 and S3 of microcomputer 19, respectively. The PNP transistor 31 transmits a high level voltage via a resistor 29 to the line CL, when an output signal S3 transmitted from the microcomputer 19 to the output buffer circuit 27 is at a low level. A voltage is transmitted from the line CL via an integrating circuit composed of a resistor 33 and a capacitor 35 for removing noise, to the input buffer circuit 37, which in turn transmits the corresponding voltage. According to a command from the microcomputer 19, an output signal VZ transmitted from the input buffer circuit 37 and output signals VLL, VLR, VUL and VUR transmitted from the output buffer circuits 21, 23, 25 and 27, respectively, are converted to an 8 bit digital signal by the A/D converter 39, which in turn transmits the digital signal. In the waveform shaping circuit 41, the output signal VZ from the input buffer circuit 37 is converted to a high level or low level ON/OFF signal O/F based on a predetermined threshold value, and the ON/OFF signal O/F is transmitted to the microcomputer 19. The ON/OFF condition of the definition key LSW and the cancellation key RSW is detected by detecting the electric potential of terminals 43a, 45a of pull-up resistors 43, 45, respectively. The output data detailed later or a digital signal indicating the movement count data and the ON/OFF condition of the definition key LSW and the cancellation key RSW is transmitted from the microcomputer 19 via the interface circuit 47 and the cable 5 to the microcomputer 19.

In the embodiment the value of resistor 29 connected between a collector of transistor 31 and the line CL has a high resistance, for example of 200 kilohms, larger than the resistance value of the resistor layer 11.

As shown in FIG. 4, output signals S1, S2 and S3 are transmitted from the microcomputer 19 via digital buffers 49, 51 and 53 to the output buffer circuits 23, 25 and 27, respectively. A digital buffer 55 supplies a current for turning on/off the transistor 31, via a resistor 57 to the base of transistor 31 corresponding to the output signal S3.

The waveform shaping circuit 41 is composed of a digital buffer 61 to which the output signal VZ of the input buffer circuit 37 is transmitted via the resistor 59, a pull-up resistor 63 for stabilizing the output level of digital buffer 61, and a capacitor 65 for eliminating noise from the output signal of digital buffer 61. When the output signal VZ of the input buffer circuit 37 is no more than the input threshold value of digital buffer 61 of about 2.5V, a low level signal is transmitted to the microcomputer 19.

When the input device 1 having the aforementioned structure of the embodiment is used, as shown in FIG. 3, an operator depresses a portion of the surface of pressure sensitive PAD with a pen, a finger tip or other member H. Therefore, the corresponding portion of the flexible sheet 7 and the conductive layer 9 is also depressed, thereby bringing the depressed portion of conductive layer 9 in contact with the resistor layer 11.

It is detected by the control circuit 17 following the process steps described later that the conductive layer 9 contacts the resistor layer 11 and the pressure sensitive PAD or flexible sheet 7 is depressed. Depressed positions are sequentially detected, and the movement count data is calculated as the displacement data representing the quantity and direction of the movement of the depressed positions in a unit time and is transmitted to the microcomputer 19.

The process steps executed by the microcomputer 19 of control circuit 17 are now explained.

Figure 5:
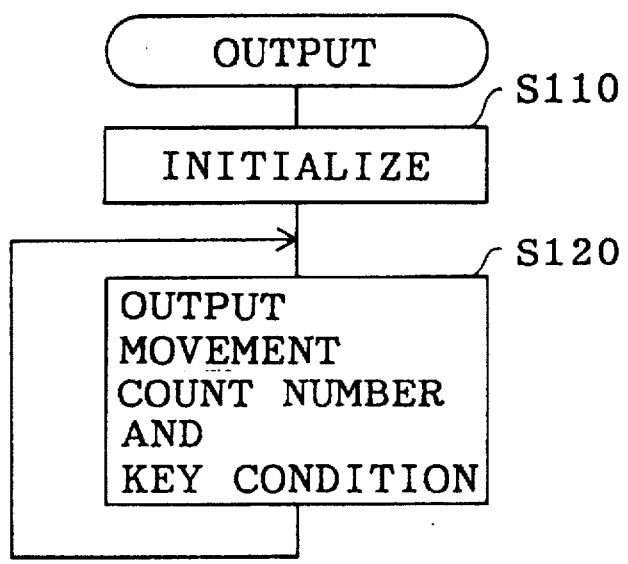
FIG. 5 is a flowchart of an output process executed in a microcomputer provided in the control circuit.

The output process shown in the flowchart of FIG. 5 continues to proceed while the input device 1 is connected via the cable 5 to the computer 19. First at step S110, an inner memory RAM is initialized.

Subsequently, at step S120 the digital signal representing the movement count number prepared at the depressed position detection process and the movement count number calculation process described later is transmitted to the interface circuit 47. At step S120 when the ON condition of the definition key LSW is detected through the click/drag determination process described later, a definition signal for indicating the definition of a cursor position to the computer is transmitted to the interface circuit 47. When the ON condition of cancellation key RSW is detected through the click/drag determination process, a cancellation signal for indicating the cancellation of the input to the computer is transmitted to the interface circuit 47.

The aforementioned definition and cancellation signals are adapted to a mouse interface in the computer and are transmitted via the interface circuit 47 and the cable 5 to the computer. In the output process, the output step of S120 is repeatedly executed.

Figure 6:
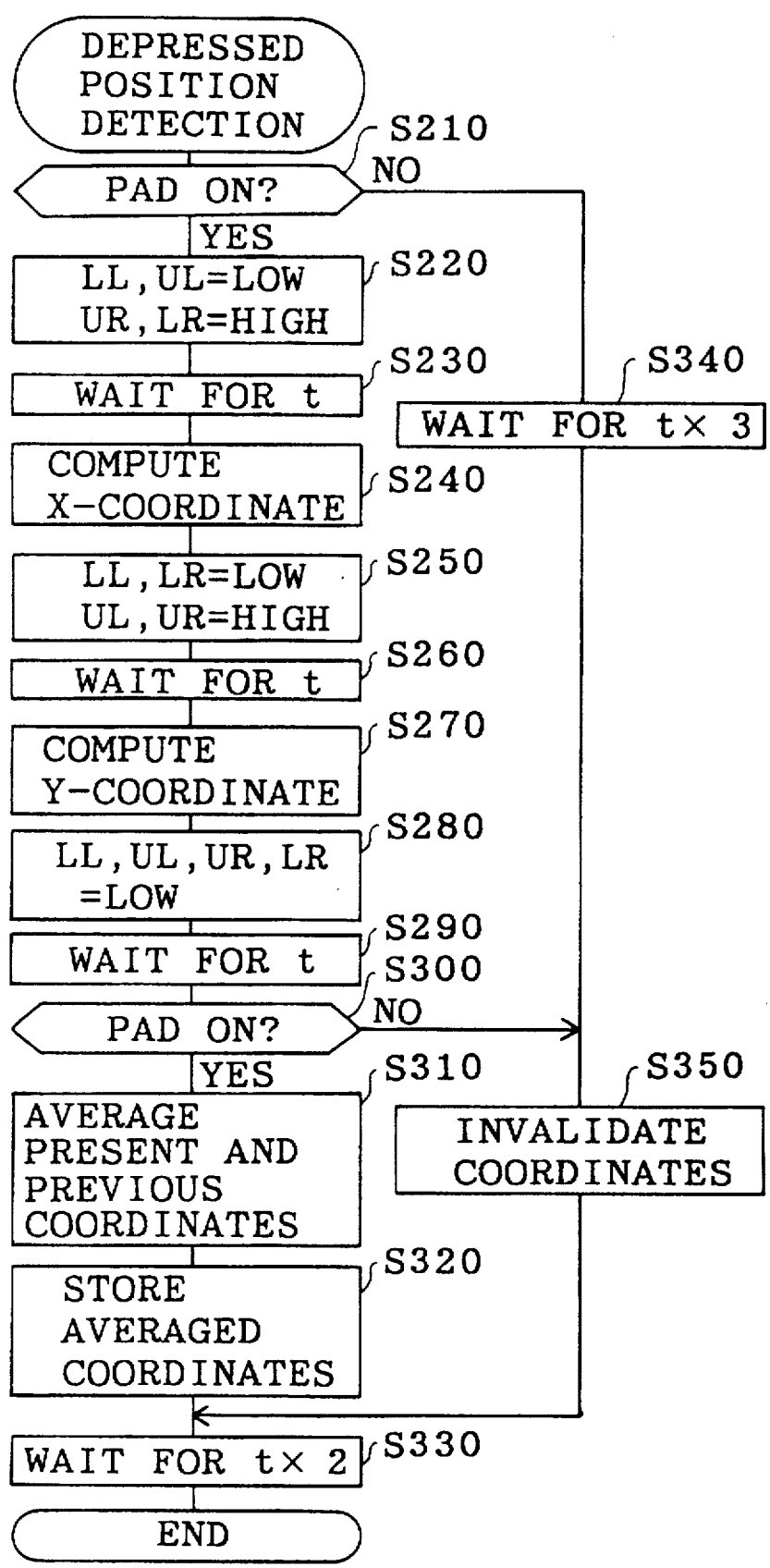
FIG. 6 is a flowchart of a depressed position detection process executed in the microcomputer.

A process of determining whether or not the pressure sensitive PAD or flexible sheet 7 is depressed and sequentially detecting depressed positions is now explained referring to FIG. 6. The depressed position detection process is executed at a time interval t, which is a basic execution cycle, and a series of the process steps are once completed in the period of time 5×t.

First at step S210 it is determined whether or not the pressure sensitive PAD is touched on.

Specifically, the microcomputer 19 transmits the output signals S1, S2 and S3 of the low level to the output buffer circuits 23, 25 and 27, respectively, beforehand, such that a voltage of 0V is applied to all the lines LL, LR, UL and UR at the four corners P1, P2, P3 and P4 of resistor layer 11. As aforementioned, the voltage of 0V is normally applied to the line LL. In this case, since the output signal S3 transmitted to the output buffer circuit 27 is at a low level, the transistor 31 turns on, thereby transmitting a voltage of 5V via the resistor 29 to the line CL connected to the conductive layer 9.

When the pressure sensitive PAD is not depressed and the conductive layer 9 does not contact the resistor layer 11, the voltage on the line CL is 5V. The output signal VZ of the input buffer circuit 37 is also 5V. Therefore, the ON/OFF signal O/F from the waveform shaping circuit 41 is at a high level.

On the other hand, when the pressure sensitive PAD is touched on, thereby bringing the conductive layer 9 in contact with the resistor layer 11, the voltage on the line CL of 5V is divided by the resistance value of resistor 29 and the resistance value of resistor layer 11. As aforementioned, the resistance value of resistor 29 is set larger than the resistance value of the resistor layer 11. Therefore, the output signal VZ of input buffer circuit 37 becomes smaller than the input threshold value of digital buffer 61 of waveform shaping circuit 41, and the ON/OFF signal O/F of waveform shaping circuit 41 becomes at a low level.

At step S210, it is determined whether or not the pressure sensitive PAD is touched on by determining whether or not the ON/OFF signal O/F transmitted from the waveform shaping circuit 41 is at a low level, when the output signals S1, S2 and S3 of the low level are transmitted to the output buffer circuits 23, 25 and 27. When the ON/OFF signal O/F is at a low level, it is determined at step S210 that the pressure sensitive PAD is depressed and the process step goes to step S220.

At step S220, the output signal S2 of the low level is transmitted to the output buffer circuit 25, the output signals S1 and S3 of the high level are transmitted to the output buffer circuits 23 and 27, a voltage of 0V is applied to lines LL and UL, and a voltage of 5V is applied to lines LR and UR. The voltage applied on the left lower corner P1 and the left upper corner P3 of resistor layer 11 becomes 0V and the voltage applied on the right lower corner P2 corner P2 and the right upper corner P4 of resistor layer 11 becomes 5V. Therefore, a voltage of 5V is applied traverse and relatively to the resistor layer 11 along axis X, as shown in FIG. 2C. Since the output signal S3 transmitted to the output buffer circuit 27 is at a high level, the transistor 31 turns off.

Subsequently, at step S230 the microcomputer 19 waits for a time interval t, which is a cycle time of the execution of the process, thereby stabilizing the applied voltage. The process of detecting the depressed position is once completed, and the process goes to the subsequent execution cycle starting at step S240.

At step S240, the output signal VZ of input buffer circuit 37 and the output signals VLL, VLR, VUL and VUR of output buffer circuits 21, 23, 25, 27 are converted into digital signals by the A/D converter 39, and the A/D value of the digital signals are read. The value of the voltage applied to lines CL, LL, LR, UL and UR is detected from the read A/D value. The coordinate in the direction along the axis X from an origin of left lower corner P1 of resistor layer 11 or X-coordinate is computed.

Figure 7A:
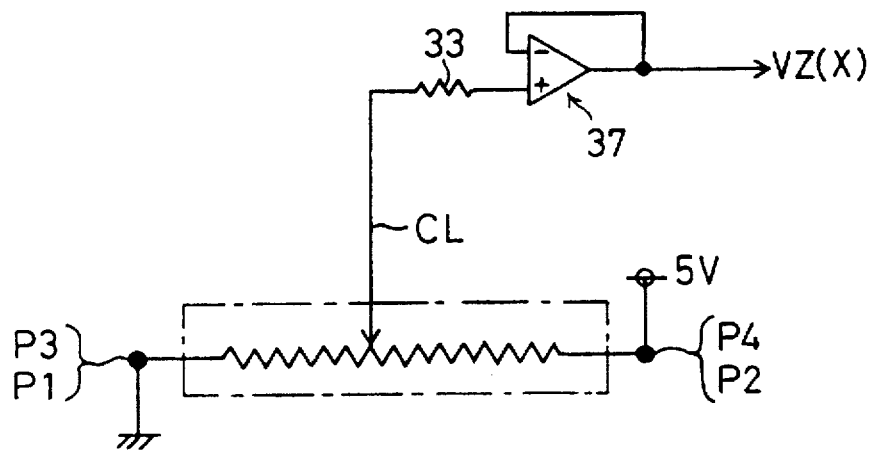
FIGS. 7A and 7B are explanatory views showing the detection of the coordinates of the depressed position.

Specifically, as shown in FIG. 7A, when the pressure sensitive PAD is touched on and a voltage of 5V is applied in the direction from corners P2 and P4 to corners P1 and P3 of resistor layer 11, a voltage VZ(X) is produced on the conductive layer 9 and the line CL, corresponding to the X-coordinate of the depressed position. For example, when the middle of the resistor layer 11 is depressed, a voltage of 2.5V is produced on the line CL, and when the left edge of resistor layer 11 is depressed, a voltage close to 0V is produced on the line CL.

Therefore, at step S240, as shown in FIG. 2C, the two dimensional coordinates of four corners P1, P2, P3 and P4 of resistor layer 11 are set as (0,0), (256,0), (0,256) and (256, 256), and the X-coordinate of the depressed position is computed based on the value of the voltage applied to the line CL or the value of the output signal VZ of input buffer circuit 37.

In the embodiment, the value of the voltage applied to lines LL, LR, UL and UR is detected, such that the coordinates of the depressed position is exactly computed. If the output characteristics of output buffer circuits 21, 23, 25 and 27 are deviated from one another, the value of the voltage actually applied to the corners P1–P4 of resistor layer 11 may be slightly deviated from a designed value. Therefore, in the embodiment, by detecting the value of the voltage actually applied to corners P1–P4 of resistor layer 11 and compensating the value of the voltage applied to the line CL using the detected value, the coordinates can be precisely computed.

After the X-coordinate of the depressed position is computed, at step S250 the output signal S1 of the low level is transmitted to the output buffer circuit 23, and the output signals S2 and S3 of the high level are transmitted to the output buffer circuits 25 and 27. A voltage of 0V is applied to the lines LL and LR of resistor line 11 and a voltage of 5V is applied to the lines UL and UR. The voltage applied to the left lower corner P1 and the right lower corner P2 becomes 0V, and the voltage applied to the left upper corner P3 and the right upper corner P4 becomes 5V. Therefore, as shown in FIG. 2C, a voltage of 5V is vertically and relatively applied along an axis Y. Since the output signal S3 transmitted to the output buffer circuit 27 is at a high level, the transistor 31 turns off.

Subsequently, at step S260, in the same manner as step S230, the microcomputer 19 waits for the time interval t, thereby stabilizing the applied voltage. After the time interval t elapses, the step of S270 is started.

At step S270, in the same manner as step S240, the output signal VZ of input buffer circuit 37 and the output signals VLL, VLR, VUL and VUR of output buffer circuits 21, 23, 25, 27 are converted into digital signals by the A/D converter 39, and the A/D value of the digital signals are read. The value of the voltage applied to lines CL, LL, LR, UL and UR is detected from the read A/D value. The coordinate in the direction along the axis Y from an origin of left lower corner P1 of resistor layer 11 or Y-coordinate is computed.

Figure 7B:
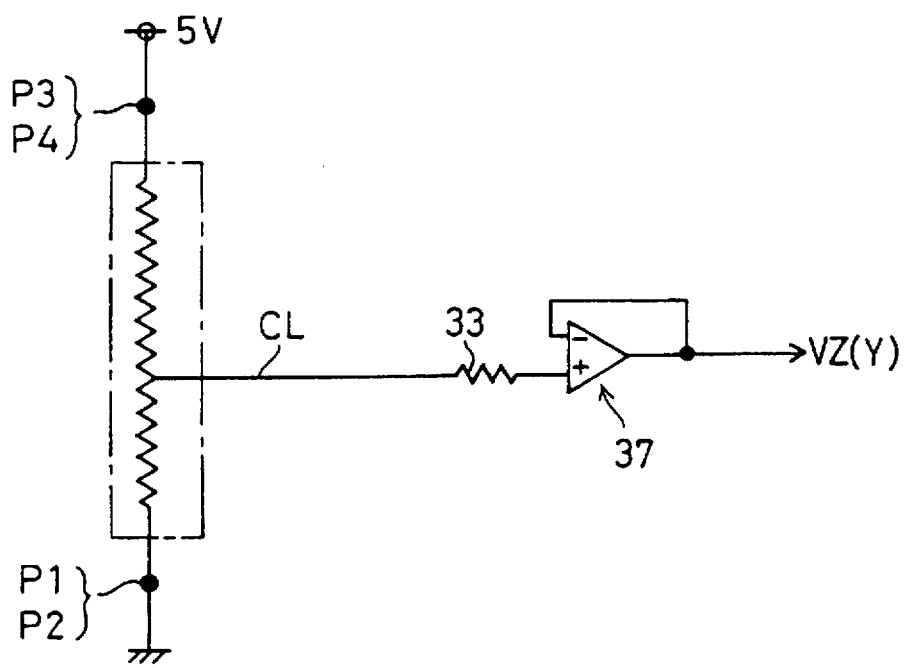

Specifically, as shown in FIG. 7B, when the pressure sensitive PAD is touched on and a voltage of 5V is applied in the direction from corners P3 and P4 to corners P1 and P2 of resistor layer 11, a voltage VZ(Y) is produced on the conductive layer 9 and the line CL, corresponding to the Y-coordinate of the depressed position. For example, when the middle of the resistor layer 11 is depressed, a voltage of 2.5V is produced on the line CL, and when the upper edge of resistor layer 11 is depressed, a voltage close to 5V is produced on the line CL.

At step S270, as shown in FIG. 2C, the two dimensional coordinates of four corners P1, P2, P3 and P4 of resistor layer 11 are set as (0,0), (256,0), (0,256) and (256, 256), and the Y-coordinate of the depressed position is computed based on the value of the voltage applied to the line CL or the value of the output signal VZ of input buffer circuit 37.

After the Y-coordinate of the depressed position is computed, at step S280 the output signals S1, S2 and S3 of the low level are transmitted to the output buffer circuits 23, 25 and 27. A voltage of 0V is applied to all the lines LL, LR, UL and UR of resistor line 11 or all the four corners P1, P2, P3 and P4 of resistor layer 11.

Subsequently, at step S290, in the same manner as step S230, the microcomputer 19 waits for the time interval t, thereby stabilizing the applied voltage. After the time interval t elapses, the step of S300 is started.

At step S300, in the same manner as S210, it is determined whether or not the pressure sensitive PAD is touched on by determining whether or not the ON/OFF signal O/F transmitted from the waveform shaping circuit 41 is at a low level, when the output signals S1, S2 and S3 of the low level are transmitted to the output buffer circuits 23, 25 and 27. When the ON/OFF signal O/F is at a low level, it is determined at step S300 that the pressure sensitive PAD is depressed and the process step goes to step S310.

At step S310, the X and Y-coordinates of the depressed position presently computed at steps S240 and S270 are stored in RAM. The present X and Y-coordinates and the X and Y-coordinates previously computed n-times, for example, four times at steps S240 and S270 are summed and averaged, thereby calculating the X and Y-coordinates representing the present depressed position. Subsequently, at S320 the X and Y-coordinates of the depressed position averaged or calculated at S310 are stored in RAM.

Subsequently, after the microcomputer 19 waits for a time interval 2×t at step S330, it one ends the process steps and repeats the execution from the step of S210.

When it is determined at step S210 that the pressure sensitive PAD is not depressed, the process goes to step S340, at which the microcomputer 19 waits for a time interval 3×t, and the process goes to step S350. Also, when it is determined at step S300 that the pressure sensitive PAD is not depressed, the process goes to the step S350. At step S350 the coordinates stored in RAM at steps S310 and S320 are all canceled and invalidated, and the process goes to S330.

At the process of detecting the depressed position, it is determined at steps S210 and S300 whether or not the pressure sensitive PAD is touched on. While the pressure sensitive PAD is depressed, a voltage of 5V is alternately horizontally and vertically on the surface of resistor layer 11 at steps S220 and S250. The X-coordinate of the depressed position is computed from the value of the voltage applied to conductive layer 9, detected when the voltage is applied horizontally, at step S240. In addition, the Y-coordinate of the depressed position is computed from the value of the voltage applied to conductive layer 9, detected when the voltage is applied vertically, at step S270.

The presently computed X and Y-coordinates and the X and Y-coordinates just previously computed n-times are summed up. The X and Y-coordinates computed n+1 times are averaged at step S310. The averaged X and Y-coordinates are stored as the coordinates representing the present depressed position in RAM at step S320. On the other hand, it is determined that the pressure sensitive PAD is not depressed, all the coordinates stored in the RAM are deleted at step S350. When the pressure sensitive PAD is again touched on, the computing and storing of the coordinates are resumed.

Since the coordinates of the presently depressed position are determined by averaging a plurality of the calculated coordinates at step S310, error can be absorbed and resolution can be enhanced from 256 to 1024.

In the embodiment, the X-coordinate and the Y-coordinate are computed at steps S240 and S270, respectively, and a plurality of the computed coordinates are averaged at step S310. Alternatively, the voltage produced on the conductive layer 9 is detected and stored in RAM at steps S240 and S270, and the detected values of the voltage are averaged at step S310, such that the X and Y-coordinates representing the present depressed position can be calculated.

Figure 8:
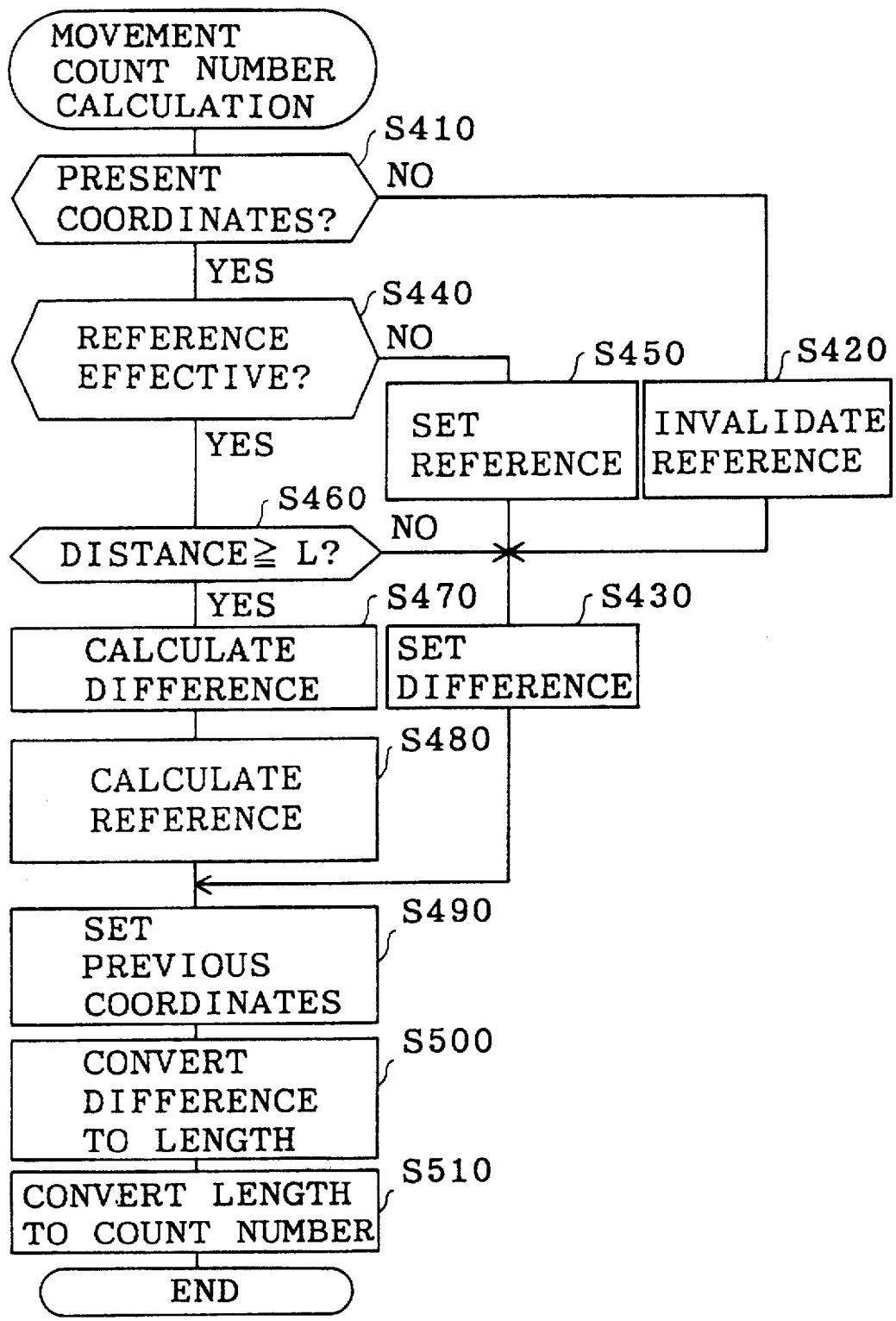
FIG. 8 is a flowchart of a movement count number calculation process executed in the microcomputer.

A process of calculating a movement count number representing the quantity and direction of the movement of the depressed position in a unit time using the X and Y-coordinates stored in RAM at step S320 of the depressed position detection process is now explained referring to FIG. 8. The movement count number calculation process is repeatedly executed parallel the depressed position detection process, every time interval 25×t.

As shown in FIG. 8, after the movement count number calculation process is started, first at step S410 it is determined whether or not there is the present X and Y-coordinates just stored in RAM. Specifically, it is determined whether or not the pressure sensitive PAD continues to be touched on before the movement count number calculation process is started, whether or not the process steps of S220 to S320 continued to be executed at least n+1 times, and whether or not the X and Y-coordinates representing the present depressed position are stored in RAM.

When it is determined at step S410 that there are no present coordinates, the pressure sensitive PAD is not depressed or the pressure sensitive PAD has just been depressed. In this case, at step S420, the reference values, which are the reference coordinates for determining whether or not the depression position is moved, is invalidated. Subsequently, at step S430 difference values ΔX,ΔY between the previous coordinates and the present coordinates is set to ((0,0)).

On the other hand, when it is determined at step S410 that there is the present coordinates, the coordinates are read and it is determined at step S440 whether or not the reference values are effective. When the answer to the step S440 is negative, at step 450 the present coordinates are set as reference values, and the process goes to step S430. Therefore, when it is first determined at step S410 that the present coordinates exist, the result of the determination step S440 is always negative, and the first detected coordinates are set as first reference values.

Subsequently, it is determined at step S440 that the reference values are effective. In this case, it was determined at step S410 at least twice that the present coordinates exist. The process then goes to step S460, at which it is determined whether or not the difference between the present coordinates and the reference values equals or exceeds a predetermined value L. When it is determined that the difference is less than the predetermined value L and that the depressed position is not moved, the process goes to step S430.

On the other hand, when it is determined at step S460 the difference between the present coordinates and the reference values equals or exceeds the predetermined value 1, at step S470 the difference values ΔX,ΔY obtained by subtracting the previous coordinates from the present coordinates are set. The difference values ΔX,ΔY represent a vector directed from the previous coordinates to the present coordinates.

Subsequently, at step S480 the latest reference values are set by adding the difference values calculated at step S470 to the present reference value. After the step of S480 is completed or after the step of S430 is completed, the process goes to step S490, at which the coordinates read at step S410 are set as the previous coordinates.

Subsequently, at step S500 the two-dimensional components ΔX,ΔY of the difference values set at step S430 or S470 are converted to a length LX along axis X and a length LY along axis Y on the surface of the resistor layer 11 in inches, using following formula (1).

$$LX = \Delta X \cdot (\text{HORIZONTAL LENGTH OF LAYER SURFACE}/256) \brace LY = \Delta Y \cdot (\text{VERTICAL LENGTH OF LAYER SURFACE}/256)} \quad (1)$$

Subsequently, at step S510 the lengths LX and LY calculated at S500 are converted to a movement count number CX along axis X and a movement count number CY along axis Y representing the quantity or length of the movement of the depressed position from when the movement count number calculation process was executed previously until the process is now executed, thereby once ending the process.

$$CX = LX \cdot \text{COUNT NUMBER PER INCH} \brace CY = LY \cdot \text{COUNT NUMBER PER INCH}} \quad (2)$$

In the embodiment, the count number per inch is set to 200.

In the movement count number calculation process, the latest one of the coordinates of the depressed position sequentially stored in RAM at step S320 of the depressed position detection process is read every time interval 25×t at step S410. The difference values ΔX,ΔY between the presently read coordinates and the previously read coordinates are obtained at step S470. The movement count numbers CX, CY representing the quantity and direction of the movement of the depressed position for the time interval 25×t, based on the difference values ΔX,ΔY at steps S500 and S510. The calculated movement count numbers CX, CY are sequentially transmitted via the interface circuit 47 and the cable 5 to the computer at the aforementioned step S120 of the output process.

Therefore, in the embodiment, when an operator touches the upper face of the flexible sheet 7 of the input device 1 with the pen, the finger tip or other member H, and moves the member H on the upper face, through the aforementioned depressed position detection process, the coordinates of the depressed position are sequentially computed and stored in RAM. Through the movement count number calculation process, the movement count numbers CX, CY representing the quantity and direction of the movement of the depressed position for the time interval 25×t are calculated and transmitted to the computer.

The cursor on the display of the computer is moved corresponding to the quantity and direction of the movement represented by the movement count numbers CX and CY. Therefore, the operator of the input device 1 can move the cursor displayed on the display in a desired direction by moving the member H on the flexible sheet 7 of the pressure sensitive PAD.

When the operator releases the pen, the finger tip or other member H from the upper face of flexible sheet 7, through the depressed position detection process it is detected that there is no contact between the conductive layer 9 and the resistor layer 11, and the coordinates stored in RAM are canceled. When the operator again touches the upper face of flexible sheet 7 with the pen, the finger tip or other member H and moves the member H on the upper face, through the movement count number calculation process, the touched position is set to a new origin and the movement count numbers CX, CY are calculated and transmitted to the computer.

For example, when the operator moves the member H to the corner of the upper face of flexible sheet 7, once releases the member H from the corner, again touches a different position of the upper face of flexible sheet 7 with the member H, and moves the member H toward the corner, the cursor can be moved continuously in the same direction. Therefore, even if the area of the upper face of flexible sheet 7 or the area of pressure sensitive PAD is smaller than the movement area of the cursor on the display, the operator can continuously move the cursor in a desired direction by intermittently and repeatedly moving the member H on the limited area of the upper face of flexible sheet 7.

In the movement count number calculation process, the first read coordinates are set as the first reference values at steps S440 and S450. The difference values ΔX,ΔY are set to ((0,0)), until the difference between the subsequently read coordinates and the reference values equals or exceeds the predetermined value L, at steps S460 and S430. When the difference equals or exceeds the predetermined value L, the difference values ΔX,ΔY are calculated at steps S460 and S470. Subsequently, the reference values are updated by adding the present difference values ΔX,ΔY to the previous values at step S480.

Therefore, when the pressure sensitive PAD is depressed and the depressed position is moved within the predetermined value L, the movement count numbers CX, CY remains (0,0). When the movement of the depressed position equals or exceeds the predetermined value L, the calculation of the movement count numbers CX,CY is started. Therefore, the cursor is prevented from being moved in an undesirable direction because of a deviation of the operator's manual operation or for other reason.

Figure 9:
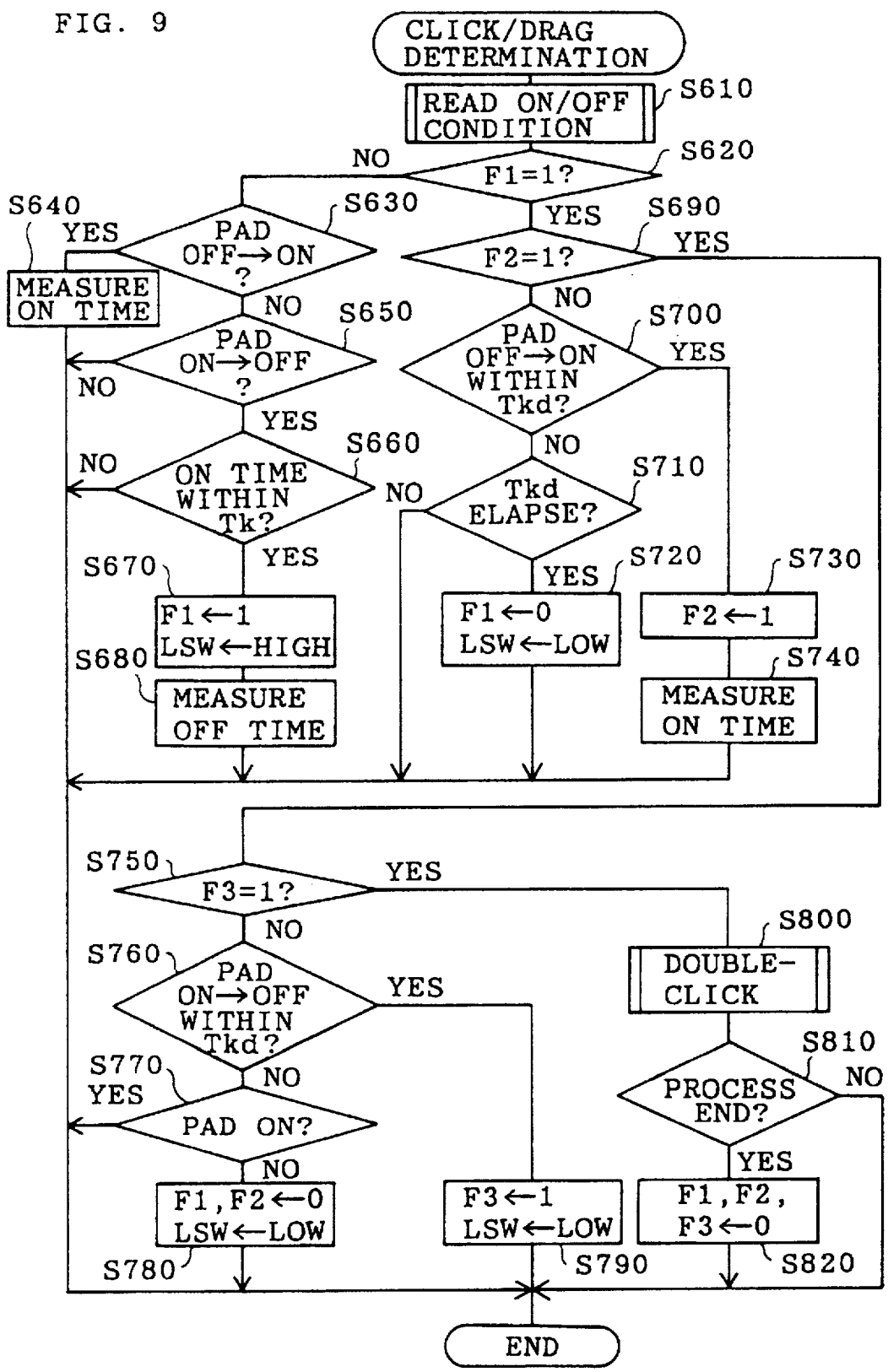
FIG. 9 is a flowchart of a click/drag determination process executed in the microcomputer.

The click/drag determination process is now explained referring to FIG. 9. In the click/drag determination process, the ON/OFF condition of definition key LSW and cancellation key RSW and the depressed condition of pressure sensitive PAD are detected, and a definition signal and a cancellation signal are transmitted to the computer at the aforementioned step S120 of the output process. The click/drag determination process is repeatedly executed parallel with the depressed position detection process and the movement count number calculation process, every time interval 5×t.

As shown in the flowchart of FIG. 9, after the click/drag determination process is started, first at step S610 the ON/OFF conditions of definition key LSW and cancellation key RSW are read, respectively. While it is detected at step S610 that the definition key LSW is turned on, the definition signal is transmitted to the computer at step S120 of the output process. While it is detected that the cancellation key RSW is turned on, the cancellation signal is transmitted to the computer at step S120.

Subsequently, it is determined at step S620 whether or not 1 is set to a first flag F1, indicating that the pressure sensitive PAD is depressed or turned ON for a predetermined time Tk of 200 ms in the embodiment. When the answer to the step S620 is negative, it is determined at step S630 whether or not the pressure sensitive PAD is depressed or turned from OFF to ON. When it is determined that the pressure sensitive PAD is depressed, at step S640 the time the pressure sensitive pad is depressed or ON time starts to be measured, thereby once ending the process.

On the other hand, when it is determined at step S630 that the pressure sensitive PAD does not change from OFF to ON, it is determined at step S650 whether or not the pressure sensitive PAD is presently released or whether or not the pressure sensitive PAD turns from ON to OFF. When the answer to the step S650 is negative, the process once ends. When it is determined at step S650 that the pressure sensitive PAD is released, it is determined at step S660 whether or not the ON time, which starts to be measured at step S640, is within the predetermined time Tk.

When it is determined at step S660 that the ON time exceeds the predetermined time Tk, the process once ends. When the ON time is within the predetermined time Tk, at step S670 1 is set to the first flag F1, the indication of the pseudo-ON condition of definition key LSW is given to the output process shown in FIG. 5. Even when the definition key LSW is actually off, the definition signal is transmitted to the computer at step S120 of the output process. Subsequently at step S680, the time the pressure sensitive pad is released or OFF time starts to be measured, once ending the process.

In the click/drag determination process, it is determined whether or not the pressure sensitive PAD is depressed (OFF to ON) or whether or not the pressure sensitive PAD is released (ON to OFF), by referring to the result of the determination at steps S210 and S300 of the depressed position detection process. The ON time and OFF time start to be measured, for example by starting the operation of a periodically counting counter provided in the microcomputer 19.

Subsequently, when it is determined at step S620 that 1 is set to the first flag F1, the process goes to step S690 at which it is determined whether or not 1 is set to a second flag F2, indicating the pressure sensitive PAD is again depressed before a predetermined time Tkd of 400 ms in the embodiment elapses since the pressure sensitive PAD is depressed shorter than the time Tk. When the answer to the step S690 is negative, it is at step S700 whether or not the pressure sensitive PAD is again depressed shorter than the time Tkd, since the OFF time starts to be measured at step S680.

When the answer to the step S700 is negative, it is determined at step S710 whether or not the time Tkd has elapsed since the OFF time started to be measured at step S680. When the answer to the step S710 is negative, the process once ends. When the time Tkd has elapsed, subsequently at step S720, 0 is set to the first flag F1 and the indication of the pseudo-ON condition of definition key LSW is given to the output process, thereby ending the process. The output of the definition signal to the computer is thus stopped.

When it is determined at step S700 that the pressure sensitive PAD is again depressed shorter than the time Tkd, since the OFF time starts to be measured at step S680, the process goes to step S730, at which 1 is set to the second flag F2. Subsequently, at step S740 the ON time starts to be measured, once ending the process.

When 1 is set to the second flag F2 at step S730 and it is determined at step S690 that 1 is set to the second flag F2, the process goes to step S750.

At step S750 it is determined whether or not 1 is set to a third flag F3, indicating the pressure sensitive PAD is again depressed shorter than the time Tk before the predetermined time Tkd elapses since the pressure sensitive PAD is depressed shorter than the time Tk. When the answer to the step S750 is negative, subsequently at step S760 it is determined whether or not the pressure sensitive PAD is released before the time Tk elapses since the ON time starts to be measured at step S740.

When the answer to the step S760 is negative, subsequently it is determined at step S770 whether or not the pressure sensitive PAD continues to be depressed. When it is determined that the pressure sensitive PAD continues to be depressed, the process once ends. When the answer to the step S770 is negative, the pressure sensitive PAD is released after the time Tk elapses since the ON time starts to be measured at step S740. At step S780, 0 is set to the first and second flags F1 and F2, the indication of the pseudo-ON condition of definition key LSW to the output process is stopped, and the process once ends. The output of the definition signal to the computer is thus stopped.

On the other hand, it is determined at step S760 that the pressure sensitive PAD is released before the time Tk elapses since the ON time starts to be measured at step S740, subsequently at step S790, 1 is set to the third flag F3, the indication of the pseudo-ON condition of definition key LSW to the output process is stopped, and the process once ends.

When at step S790, 1 is set to the third flag F3, and it is determined at step S750 that 1 is set to the third flag F3, subsequently at S800 the double-click process is executed. In the double-click process, it is determined whether or not the predetermined time Tf of 50 ms in the embodiment since the indication of the pseudo-ON condition to the output process is stopped at step S790. When it is determined that the predetermined time Tf elapses, the indication of the pseudo-ON condition of definition key LSW is again given to the output process for a predetermined time To of 50 ms in the embodiment.

Subsequently, it is determined at step S810 whether or not the double-click process ends. When the answer to the step S810 is negative, the process once ends. When it is determined that the double-click process ends, subsequently at step S820, 0 is set to all the flags F1, F2 and F3, once ending the process.

In the click/drag determination process, the ON/OFF condition of definition key LSW and cancellation key RSW provided on the body 3 of input device 1 is detected at step S610. According to the result of the step S610 the definition signal and the cancellation signal are transmitted to the computer in the output process shown in the flowchart of FIG. 5. Even when the definition key LSW is not turned on, the definition signal can be transmitted responsive to the depression of the pressure sensitive PAD at the steps subsequent to step S620.

Figure 10A:
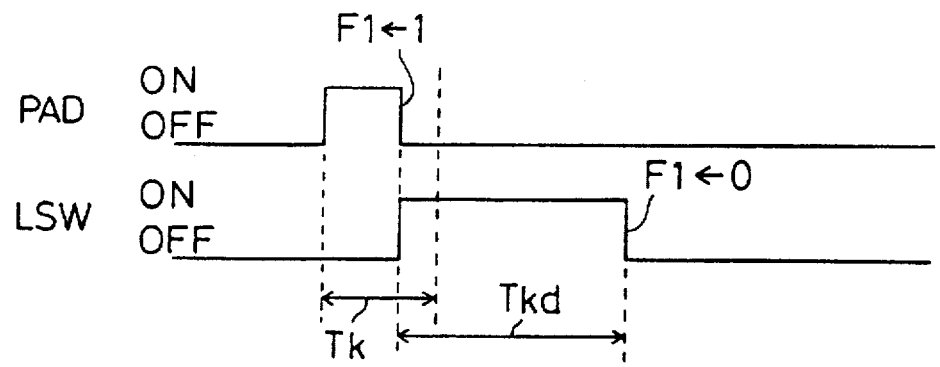
FIGS. 10A, 10B and 10C are timing charts of the click/drag determination process.

When it is determined at steps S620–S660 that the pressure sensitive PAD is depressed shorter than the time Tk, as shown in FIG. 10A, 1 is set to the first flag F1, and the indication of the pseudo-ON condition of definition key LSW is given to the output process at step S670. Subsequently, when the pressure sensitive PAD is not again depressed by the time when the time Tkd elapses at steps S680, S690–S710, no indication of the pseudo-ON condition of definition key LSW is given to the output process at step S720.

Therefore, as shown in FIG. 10A, when the pressure sensitive PAD is depressed shorter than the time Tk, it is presumed that the definition key LSW is depressed shorter than the time Tkd, and the definition signal is transmitted to the computer for the time Tkd. Just by depressing the pressure sensitive PAD shorter than the time Tk, the position of the cursor can be defined or clicked.

Figure 10B:
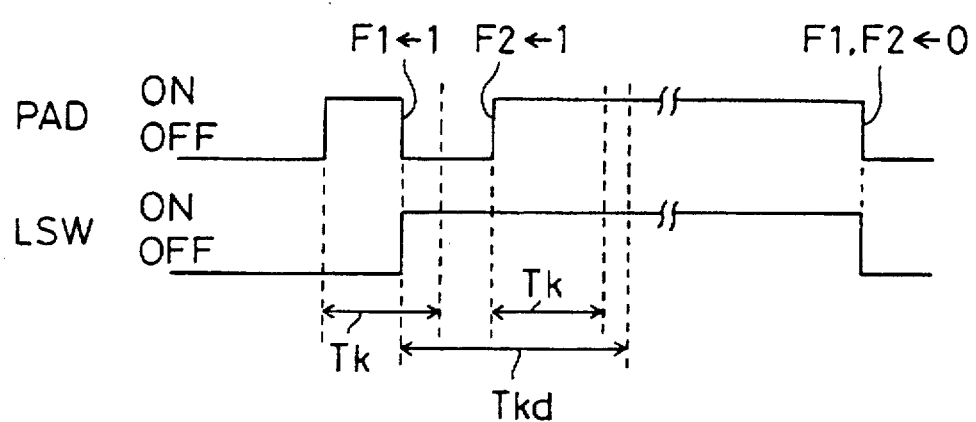

On the other hand, after the pressure sensitive PAD is depressed shorter than the time Tk, and the output of the definition signal is started, as shown in FIG. 10B, the pressure sensitive PAD is again depressed by the time when the time Tkd elapses or the output of the definition signal is completed at step S700. Subsequently, 1 is set to the second flag F2 at step S730 and the ON time of the pressure sensitive PAD is measured again at step S740. When the ON time exceeds the time Tk, the indication of the pseudo-ON condition of definition key LSW continues to be given to the output process, until it is determined that the pressure sensitive PAD is released, at steps S760–S780.

As shown in FIG. 10B, before the time Tkd elapses since the pressure sensitive PAD is depressed shorter than the time Tk, it is again depressed longer than the time Tk, while the definition signal continues to be transmitted to the computer. When the depressed position of pressure sensitive PAD is moved in a desired direction, as aforementioned the movement count number representing the quantity and direction of the movement of the depressed position is sequentially transmitted to the computer. This process can replace the mouse dragging operation in which a mouse is moved with a definition switch depressed.

Figure 10C:
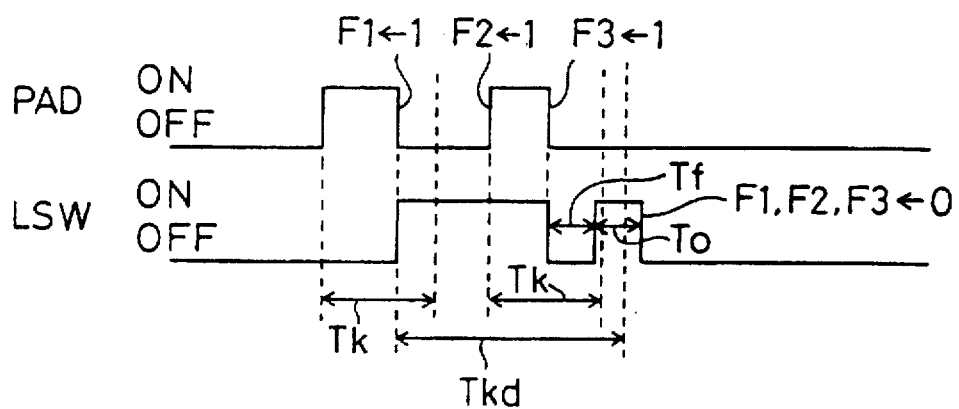

As shown in FIG. 10C, before the time Tkd elapses since the pressure sensitive PAD is depressed shorter than the time Tk and the definition signal starts to be transmitted, the pressure sensitive PAD is again depressed, then the answer to the step S700 is affirmative. When the pressure sensitive PAD is again depressed shorter than the time Tk, the answer to the step S760 is affirmative. At the same time when the pressure sensitive PAD is released, 1 is set to the third flag F3, and the indication of the pseudo-ON condition of definition key LSW to the output process is stopped at step S790. Subsequently, after the predetermined time Tf elapses, the indication of the pseudo-ON condition of definition key LSW is transmitted to the output process for the predetermined time To at step S800.

As shown in FIG. 10C, before the time Tkd elapses since the pressure sensitive PAD is depressed shorter than the time Tk, it is again depressed shorter than the time Tk, then the definition signal is transmitted to the computer twice. This process can replace the mouse double-click operation in which the definition switch of the mouse is depressed twice quickly.

As aforementioned, by touching the flexible sheet 7 of pressure sensitive PAD of input device 1 with the pen, the finger tip or other member H and moving the member H on the flexible sheet 7, the cursor displayed on the display of the computer can be moved in a desired direction and by a desired distance. As aforementioned, even if the area of the upper face of flexible sheet 7 or the area of pressure sensitive PAD is smaller than the movement area of the cursor on the display, the operator can continuously move the cursor in a desired direction by intermittently and repeatedly moving the member H on the flexible sheet 7.

The input device 1 of the embodiment is small-sized and can be used in a narrow space on a desk or other. In addition, the input device 1 is light-weight, can bear any shock, and can be easily transported, different from the mouse provided with the rotary mechanism for rotatably supporting the ball.

In the embodiment, without depressing the definition key LSW, just by depressing the pressure sensitive PAD shorter than the time Tk, the position of the cursor can be defined or clicked. Before the time Tkd elapses since the pressure sensitive PAD is depressed shorter than the time Tk, it is again depressed for the time Tk or longer, which can replace the dragging of the mouse. Furthermore, before the time Tkd elapses since the pressure sensitive pad is depressed shorter than the time Tk, it is depressed for the time Tk or shorter, which can replace the double-clicking of the mouse.

In the embodiment, just by touching the pressure sensitive PAD of the input device 1 with the pen, the finger tip or other member H, the cursor can be moved easily. The click/drag and double-click operations can be easily conducted.

In the embodiment, the resistor layer 11 is a square having the same size as that of the square region R, 60 mm×60 mm(23.6 inches×23.6 inches). The resistor layer 11 can be a rectangle with longer sides of 50 mm(19.7 inches) and shorter sides of 40 mm(15.7 inches).

Figure 11:
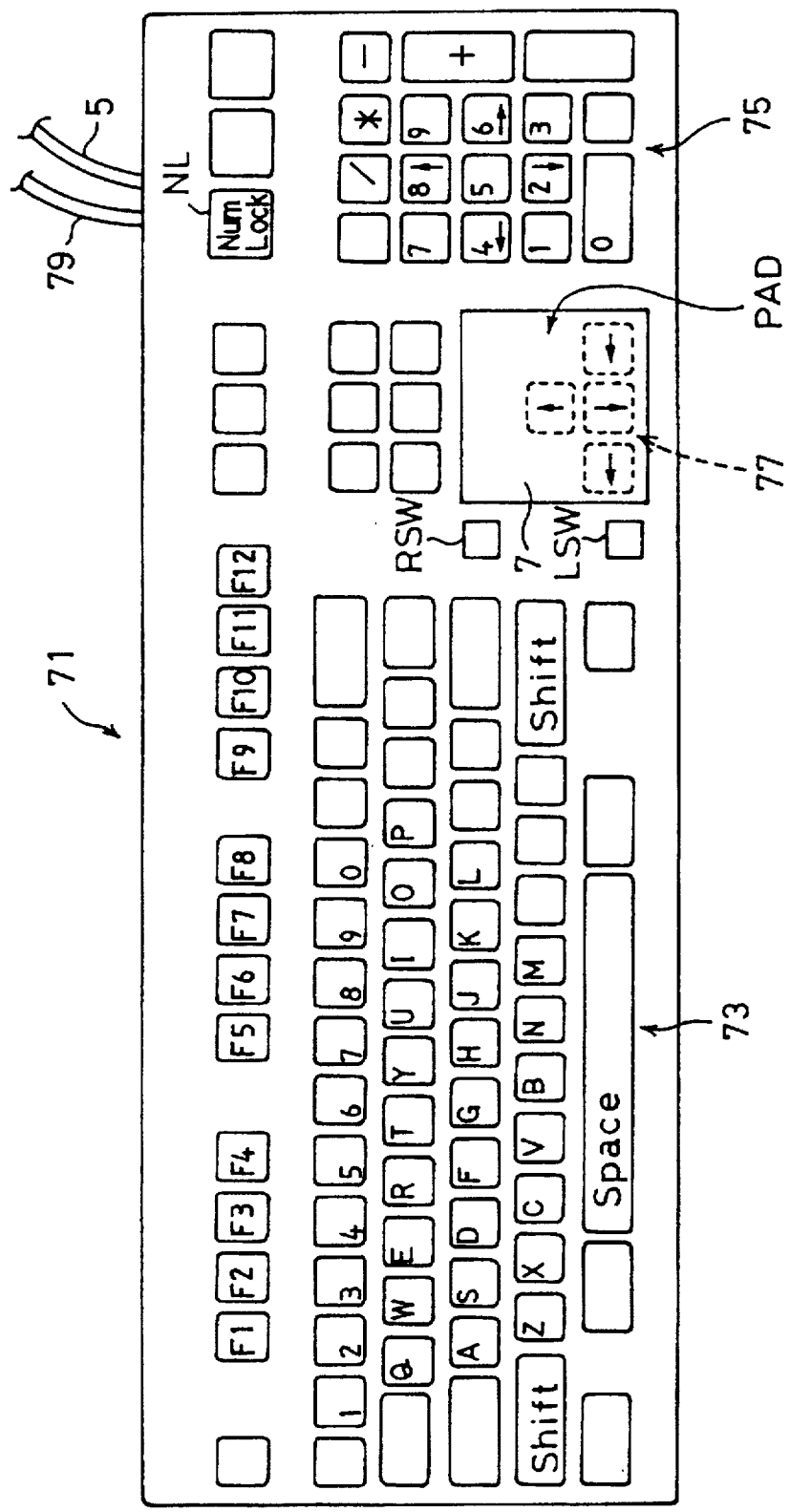
FIG. 11 is a plan view showing a keyboard of a second embodiment.

A keyboard 71 of a second embodiment is now explained referring to FIG. 11. The embodiment is applied, for example, to an IBM-manufactured 101 type keyboard connected to an IBM-PC/AT type personal computer or its interchangeable unit.

In the 101 type keyboard, as shown in FIG. 11, alphabetical keys A–Z, a Shift key and a Space key are disposed in a main key area 73, and numerical keys 0–9 and four computation keys +,–, * and / are arranged in a ten key area 75.

When a number lock key NL, provided on the upper portion of ten key area 75, is depressed, the numerical keys 8, 2, 4 and 6 can be used for moving the cursor vertically and horizontally, respectively. These numerical keys 8, 2, 4 and 6 have a combined function of entering the corresponding numerical values and of a cursor key. Every time the number lock key NL, a self-holding key, is depressed, its depression condition is retained or released.

In the conventional 101 type keyboard, as shown by dotted lines in FIG. 11, four cursor keys 77 are provided between the main key area 73 and the ten key area 75, for moving the cursor vertically and horizontally, respectively. In the keyboard 71, however, instead of the cursor keys 77, a pressure sensitive PAD is provided.

The keyboard 71 of the embodiment is a combination of the conventional 101 type keyboard and the aforementioned input device 1 excluding the body 3 shown in FIG. 1. The control circuit 17 shown in FIGS. 3 and 4 is provided in the keyboard 71. The pressure sensitive PAD is disposed between the main key area 73 and the ten key area 75, replacing the conventional cursor keys 77, such that the upper face of flexible sheet 7 is exposed.

The aforementioned definition key LSW and cancellation key RSW are provided vertically between the main key area 73 and the pressure sensitive PAD, respectively.

The cable 5 connected to the control circuit 17 shown in FIGS. 3 and 4, and a known cable 79 for transmitting the code or information responsive to the depression of the keys on the keyboard 71 are extended from the bottom of keyboard 71. The keyboard 71 is connected to the computer by connecting a not-shown connector at the tip of cable 5 to a mouse terminal of the computer and connecting a not-shown connector at the tip of cable 79 to a keyboard terminal of the computer.

In the keyboard 71 having the aforementioned structure, in the same manner as the aforementioned input device 1, by touching the flexible sheet 7 of pressure sensitive PAD with the pen, the finger tip or other member H and moving the member H on the flexible sheet 7, the cursor displayed on the display of the computer can be moved in a desired direction. Additionally, when any key on the keyboard 71 is depressed, the alphabetical, numerical or other data corresponding to the depressed key can be transmitted to the computer.

Therefore, only with the keyboard 71 of the embodiment, the cursor can be optionally moved and the alphabetical, numerical or other data can be transmitted. The input system of the computer can be built in a narrower space. Since the keyboard 71 obviates the necessity of a separate input device for moving the cursor, the table or other space in which the keyboard 71 is placed can be used effectively.

Also in the keyboard 71, just by depressing the pressure sensitive PAD for the time Tk or shorter, the click operation can be executed. By again depressing the pressure sensitive PAD for the time Tk or longer before the time Tkd elapses since the pressure sensitive PAD is depressed for the time Tk or shorter, the drag operation can be executed. Furthermore, by again depressing the pressure sensitive PAD for the time Tk or shorter before the time Tkd elapses since the pressure sensitive PAD is depressed for the time Tk or shorter, the double-click operation can be executed.

In the keyboard 71 of the embodiment, the pressure sensitive PAD is disposed in the position where the cursor keys 77 were conventionally disposed. Without enlarging the entire size of the keyboard, the advantage of the invention can be achieved.

Additionally, in the keyboard 71 of the embodiment, as required in the application program or other in the computer, the cursor can be moved vertically and horizontally with the four numerical keys 8, 2, 4 and 6, with the number lock key NL being depressed.

Therefore, in the keyboard 71 of the embodiment, the cursor can be moved in a desired direction with the pressure sensitive PAD and vertically and horizontally with the predetermined numerical keys, such that various application programs can be dealt with.

In the keyboard 71, the definition key LSW and the cancellation key RSW are provided for indicating the definition and cancellation of the cursor position to the computer. These keys LSW and RSW can be replaced with the other keys provided on the keyboard 71. For example, the cursor position is defined or canceled by depressing the predetermined two keys at the same time. The entire size of keyboard 71 can thus be reduced.

In the aforementioned embodiment, the function of microcomputer 19 of control circuit 17 can be incorporated in the microcomputer provided in the keyboard 71, thereby obviating the necessity of the microcomputer 19. Additionally, the keyboard 71 can be connected via a single cable to the computer by combining the cable 5 with the cable 79 and combining the interface 47 connected via the cable 5 shown in FIG. 4 with an interface circuit connected via the cable 79.

This invention has been described above with reference to the preferred embodiments as shown in the figures. Modifications and alterations may become apparent to one skilled in the art upon reading and understanding the specification. Despite the use of the embodiments for illustration purposes, the invention is intended to include all such modifications and alterations within the spirit and scope of the appended claims.

What is claimed is:

1. An input device for transmitting a displacement data representing the quantity and direction of the movement of a cursor to a computer, comprising:

a pressure sensitive pad having a conductive layer and a resistor layer disposed at a predetermined vertical interval from said conductive layer, at least an upper one of said conductive layers and said resistor layer being formed from an underside of a flexible sheet, such that when an upper face of said flexible sheet is depressed, said conductive layer is brought in contact with said resistor layer at a corresponding depressed position;

a contact detection means for detecting a contact between said conductive layer and said resistor layer;

a voltage application means for alternately applying a voltage alternately in a horizontal direction and in a vertical direction on a surface of said resistor layer when contact between said conductive layer and said resistor layer is detected by said contact detection means;

a position computation means for detecting a voltage of said resistor layer synchronously when the voltage is applied by said voltage application means and for sequentially computing the depressed position on said flexible sheet, based on the voltage value detected when the voltage is applied in said horizontal direction and the voltage value detected when the voltage is applied in said vertical direction;

a memory means for storing a computation result of said position computation means;

a data preparation means for preparing displacement data representing a quantity and direction of movement of said depressed position for a predetermined unit time, based on a plurality of computation results stored in said memory means;

an output means for transmitting the displacement data prepared by said data preparation means to said computer;

an initialization means for stopping operation of said voltage application means and canceling content stored in said memory means when the contact detection means detects disconnection of said conductive layer from said resistor layer;

a contact time measurement means for measuring a time during which said conductive layer and said resistor layer are in contact with each other, based on the detection result of said contact detection means; and a definition signal output means for determining whether the time measured by said contact time measurement means is within a predetermined time and for indicating a definition of a cursor position to said computer when said time is within said predetermined time.

2. The computer input device according to claim 1, wherein said contact detection means again detects a contact between said conductive layer and said resistor layer before said definition signal output means completes the output of said definition signal, and when the time measured by said contact time measurement means exceeds said predetermined time, said definition signal continuously transmits said definition signal until said contact detection means detects a disconnection from said conductive layer from said resistor layer.

3. The computer input device according to claim 1, wherein said contact detection means again detects a contact between said conductive layer and said resistor layer before said definition signal output means completes the output of said definition signal, and when the time measured by said contact time measurement means is within said predetermined time, said definition signal output means once stops the output of said definition signal at the same time when said contact detection means detects a disconnection from said conductive layer from said resistor layer, and after a predetermined time elapses, said definition signal output means resumes the output of said definition signal.

4. The computer input device according to claim 1, wherein said position computation means includes an averaging means for averaging the depressed positions computed a plurality of times, and the averaged depressed position information is stored in said memory means.

5. A keyboard for inputting information responsive to depression of keys to a computer, comprising:

a housing;

character keys mounted on a surface of said housing for inputting alphabetical and numerical characters;

a pressure sensitive pad provided on the surface of said housing and having a conductive layer and a resistor layer disposed at a predetermined vertical interval from said conductive layer, at least an upper one of said conductive layers and said resistor layer being formed from an underside of a flexible sheet, such that when an upper face of said flexible sheet is depressed, said conductive layer is brought in contact with said resistor layer at a corresponding depressed position;

a contact detection means for detecting a contact between said conductive layer and said resistor layer;

a voltage application means for alternately applying a voltage alternately in a horizontal direction and in a vertical direction on a surface of said resistor layer when contact between said conductive layer and said resistor layer is detected by said contact detection means;

a position computation means for detecting a voltage of said resistor layer synchronously when the voltage is applied by said voltage application means and for sequentially computing the depressed position on said flexible sheet, based on the voltage value detected when the voltage is applied in said horizontal direction and the voltage value detected when the voltage is applied in said vertical direction;

a memory means for storing a computation result of said position computation means;

a data preparation means for preparing displacement data representing a quantity and direction of movement of said depressed position for a predetermined unit time, based on a plurality of computation results stored in said memory means;

an output means for transmitting the displacement data prepared by said data preparation means to said computer;

an initialization means for stopping operation of said voltage application means and canceling content stored in said memory means when the contact detection means detects disconnection of said conductive layer from said resistor layer;

a contact time measurement means for measuring a time during which said conductive layer and said resistor layer are in contact with each other, based on the detection result of said contact detection means; and a definition of signal output means for determining whether the time measured by said contact time measurement means is within a predetermined time and for indicating a definition of a cursor position to said computer when said time is within said predetermined time.

6. The keyboard according to claim 5, wherein said contact detection means again detects a contact between said conductive layer and said resistor layer before said definition signal output means completes the output of said definition signal, and when the time measured by said contact time measurement means exceeds said predetermined time, said definition signal output means continuously transmits said definition signal until said contact detection means detects a disconnection from said conductive layer from said resistor layer.

7. The keyboard according to claim 5, wherein said contact detection means again detects a contact between said conductive layer and said resistor layer before said definition signal output means completes the output of said definition signal, and when the time measured by said contact time measurement means is within said predetermined time, said definition signal output means once stops the output of said definition signal at the same time when said contact detection means detects a disconnection from said conductive layer from said resistor layer, and after a predetermined time elapses, said definition signal output means resumes the output of said definition signal.

8. The keyboard according to claim 5, further comprising:

a changeover key; and keys having switchable functions of moving a cursor and of entering the predetermined data other than the cursor movement data, responsive to the operation of said changeover key.

* * * * *